United States Patent

[11] 3,542,150

| [72] | Inventors | Arthur H. Youmans;<br>James O. Guy, Houston, Texas |
|---|---|---|
| [21] | Appl. No. | 766,410 |
| [22] | Filed | Oct. 10, 1968 |
| [45] | Patented | Nov. 24, 1970 |
| [73] | Assignee | Dresser Industries, Inc.,<br>Dallas, Texas<br>a corporation of Delaware |

[54] ACOUSTIC WELL-LOGGING APPARATUS HAVING ANGLED ACOUSTIC TRANSDUCERS
6 Claims, 11 Drawing Figs.

[52] U.S. Cl................................................. 181/0.5,
340/15.5, 340/18
[51] Int. Cl..................................................... G01v 1/40
[50] Field of Search............................................ 181/0.5ED-
CIP; 340/8(L), 15.5, 18

[56] References Cited
UNITED STATES PATENTS

| 3,270,316 | 8/1966 | Walker et al. .................. | 340/18 |
| 2,438,936 | 4/1948 | Mason........................... | 340/8X |
| 2,694,461 | 11/1954 | Martin.......................... | 181/0.5 |
| 3,138,219 | 6/1964 | Blizard ......................... | 181/0.5 |
| 3,378,097 | 4/1968 | Straus et al. .................. | 181/0.5 |
| 3,406,776 | 10/1968 | Henry........................... | 181/0.5 |
| 3,426,865 | 2/1969 | Henry........................... | 181/0.5 |

Primary Examiner—Richard A. Farley
Assistant Examiner—Daniel C. Kaufman
Attorneys—Robert W. Mayer, Daniel Rubin, Peter J. Murphy, Frank S. Troidl, Roy L. Van Winkle and William E. Johnson, Jr.

ABSTRACT: A borehole apparatus having one or more acoustic pad members is arranged for traversing an earth borehole. The acoustic transducers are mounted at an acute angle from a vertical plane parallel to the borehole axis, the transducers being mounted in a fluid coupling medium having predetermined acoustic transmission properties. In one embodiment, the angle can be adjusted for optimum reinforcement of the acoustic energy while in the borehole. In an alternative embodiment, the fluid coupling interface is adjustable in addition to, or instead of, the transducer itself.

Patented Nov. 24, 1970

ARTHUR H. YOUMANS
JAMES O. GUY
INVENTOR.

BY William E. Johnson Jr.
ATTORNEY

ARTHUR H. YOUMANS
JAMES O. GUY
INVENTOR.

BY William E. Johnson, Jr.
ATTORNEY

ARTHUR H. YOUMANS
JAMES O. GUY
INVENTOR.

FIGURE 10   FIGURE 9

ARTHUR H. YOUMANS
JAMES O. GUY
INVENTOR.

BY William E. Johnson Jr.
ATTORNEY

FIGURE 11

ACOUSTIC WELL-LOGGING APPARATUS HAVING ANGLED ACOUSTIC TRANSDUCERS

BACKGROUND OF THE INVENTION

This invention relates to well-logging apparatus and more particularly to acoustic well-logging apparatus having improved directional characteristics.

Acoustic well-logging is used in the geophysical and seismic arts to provide surveys of formations traversed by earth boreholes. In particular, acoustic velocity measurements provide valuable information concerning the type of rocks and the porosity of the rocks in the formations surrounding the borehole. The most commonly measured acoustic parameter in the field of well-logging has been the velocity of compressional waves. Of great importance also is the velocity of shear waves and the velocity of other modes of acoustic energy transmission. Additionally, the acoustic impedance, as indicated by the attenuation of various transmission modes, is a parameter considered to be of value in the determination of various mechanical and chemical characteristics of the formations and their contained fluids. A further characteristic of formations which are particularly desirable to recognize by logging techniques relates to the extent to which the rock matrix is fractured. Still another characteristic of interest to geologists relates to the relative abundance of large void spaces in the formations, commonly referred to as vugs, especially when such vugs do not contribute to the effective porosity of the formation occupied by recoverable fluids.

Other rock characteristics which might be measured or deduced by acoustic measurements more sophisticated than previously known in the art relate to the vertical contrasts and variations in the strata, such measurements requiring a high degree of resolution. For example, many shales and sands have interbedded layers which vary greatly in permeability and porosity within distances of no more than a few inches. Thus, a series of permeable sands each only a few inches thick may be interbedded among thin layers of impermeable shale. Acoustic logging devices of the prior art could not resolve these individual strata since the limit of resolution of the common commercial devices is about two feet. Since in many instances valuable strata such as those containing oil, sulfur, uranium, copper, iron and many others can be recognized and evaluated in a quantitative way only if the acoustic velocity is known, a higher degree of resolution is necessary than has been previously available if such strata are to be identified.

In attempting to construct higher resolution devices, the prior art has been hampered by orientation problems. Such acoustic devices have generally been cylindrically symmetrical about the borehole instrument axis and the instrument hangs free in the borehole or, on occasion, may be equipped with a centralizer. Because of the great variations in borehole sizes, such an instrument must be designed so that the distances between the transmitter and receivers and between the respective receivers is large compared to the borehole diameter. However, such circumstances cause much acoustic energy to be dissipated in the borehole. Further, it has been extremely difficult to distinguish between acoustic waves that have been reflected by the borehole and those that have traveled through the formation rock. Likewise, very short or high frequency acoustic pulses or wave fronts used with such systems cannot be transmitted from a centrally located cylindrical transmitter to a similar receiver without loss of high frequency components unless the instrument is exactly centralized and the borehole is exactly circular. Since it is well known that boreholes are frequently elliptical and are usually irregular, high resolution and extreme precision cannot be attained in such boreholes except by excluding the effects of the borehole.

In attempting to exclude the borehole effect by shielding all but one side of the acoustic device, it has been found that instruments equipped with decentralizers are, of themselves, quite unsatisfactory because of the high level of acoustic disturbances generated by the instrument due to the "road noise" occasioned by scraping the instrument along the borehole wall.

It is therefore the primary object of this invention to provide an improved acoustic well-logging apparatus;

It is another object of the invention to provide an acoustic well-logging apparatus having an improved ability to resolve strata interfaces and to define thin strata;

It is still another object of the invention to provide an improved acoustic well-logging apparatus having an output indicative of variations in the condition of a borehole wall such as diameter variations in the condition of a borehole wall such as diameter variations and mudcake thickness changes;

It is yet another object of the invention to provide an improved well-logging apparatus having increased accuracy for measuring acoustic compressional waves;

It is still another object of the invention to provide an improved apparatus for measuring the velocity of acoustic shear waves in an earth borehole; and It is a further object of the invention to provide an acoustic well-logging apparatus having means for simultaneously obtaining separate logs of opposite sides of the borehole.

The objects of the invention are accomplished, broadly, by the provision of a well-logging apparatus having one or more acoustic pad members mounted on a borehole instrument in such a manner as to be urged against the wall of the borehole during the logging operation. The acoustic pad member has a plurality of acoustic transducers mounted as selected angles in a fluid coupling medium having predetermined velocity characteristics to provide optimized reinforcement of the acoustic signals returning from the formations surrounding the borehole.

These and other objects, features and advantages of the invention will become apparent to those skilled in the art upon a reading of the following detailed description and drawing, in which:

Figures 1, 2, 3:
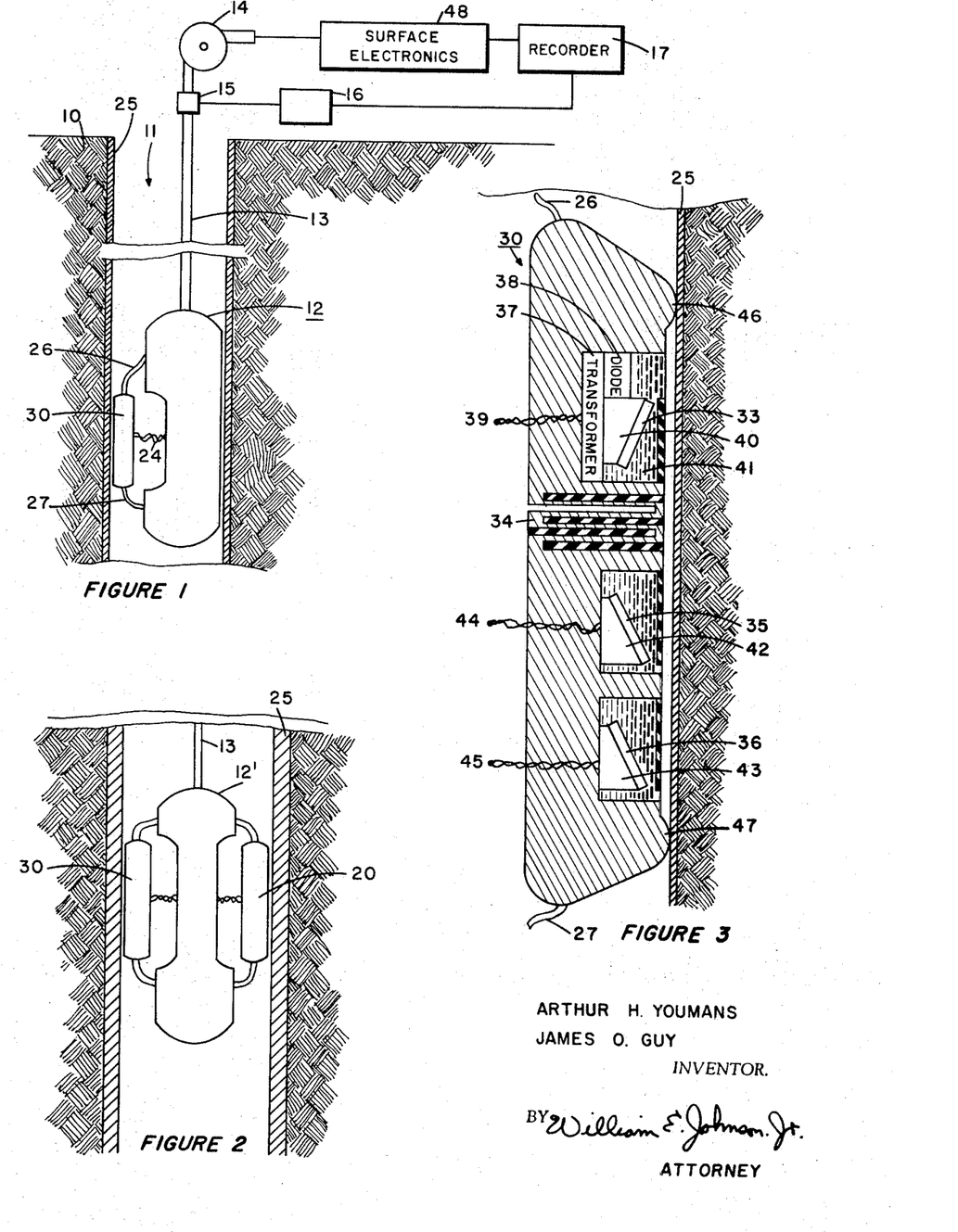
FIG. 1 illustrated schematically a side elevation, partly in cross section, of a borehole instrument according to the invention shown in operative position in an earth borehole.
FIG. 2 illustrates schematically an alternative embodiment of the invention wherein the borehole instrument is equipped with two sensing pads respectively contacting opposite sides of the borehole wall.
FIG. 3 illustrates schematically a pad acoustic section of the apparatus according to FIGS. 1 and 2.

Referring now to the drawing in more detail, and especially to FIG. 1, there is illustrated a portion of the earth's surface 10 traversed by an earth borehole 11. A well-logging instrument 12 is suspended in the borehole by a logging cable 13, the cable 13 being wound on a drum 14 at the earth's surface. The cable 13 also passes over a measuring sheave 15 to drive a transmission 16, which in turn drives the recorder 17, for example, an x-y plotter, so that the information recorded thereon from the surface electronics section 48 is related to depth in the borehole.

The instrument 12 has a pad member 30. In a manner well known in the well-logging art, the pad 30 is urged into contact with the borehole wall or with the layer of mud cake 25 thereon, if any, by a pair of spring members 26 and 27.

Since the composition and thickness of the mud cake 25 are unknown quantities, at least to some extent, it is desirable to measure the acoustic properties of the formations without introducing a measurement error due to the presence of the mud cake or other anomalous variations in the condition of the borehole wall. As will be explained hereinafter, the apparatus of FIG. 3 and its associated electronics provides such a means to measure an acoustic property, for example, velocity of the formation, free of such error, moreover providing a means to determine whether the pad 30 is substantially in contact with the formation rock or is held away from contact with a layer of mud cake or by variations in the diameter or roughness of the borehole.

In FIG. 2 there is illustrated schematically an alternative embodiment of the borehole instrument 12' having a first acoustic pad member 20 and a second acoustic pad member 30, the two substantially identical acoustic pad members being positioned on opposite sides of the instrument 12'. Both of the members 20 and 30 have springs to urge them into contact with either the borehole wall or with the mud cake layer 25 thereon. Thus, with the apparatus according to this embodiment, there are means to simultaneously log the formations on opposite sides of the borehole.

In FIG. 3 there is illustrated in more detail the acoustic pad 30 which is held in contact with the borehole wall and mud cake 25 by a pair of spring members 26 and 27. The pad 30, machined from a piece of steel for mechanical strength, has a cavity for mounting a transmitting transducer 33, an acoustic isolator section 34 and a pair of cavities for mounting the receiving transducers 35 and 36. The acoustic isolator section, providing a tortuous path of high acoustic impedance between the transmitter and receivers, consists of a series of slots which are filled with 70 Durometer rubber to add mechanical stability and to delay acoustic energy which would otherwise travel directly down the pad.

The cavity for the transmitting transducer is large enough to also hold a high voltage transformer 37 and damping diode 38. The transformer 37, having a 220 volt input along the conductors 39 from the downhole electronics (not illustrated) in the instrument 12, produces a 4KV pulse on its secondary winding across which the transmitting transducer 33 is connected. The voltage pulse of the transformer especially wound for this pad assembly has a risetime of 5 microseconds corresponding to the time taken by the particular transducer described hereinafter to achieve a maximum thickness dimension change before the pulse starts to drop. Those skilled in the art will recognize that the voltages and risetimes desired are attainable by a careful consideration of materials and geometry, and that other risetimes can be used for different transducer requirements.

The transducer 33 itself, in the preferred embodiment, is a 1.5 inch diameter, .25 inch thick lead zirconate ceramic disk, the disk being mounted on the base 40, for example, constructed of Teflon (polytetrafluoroethylene).

Figure 4:
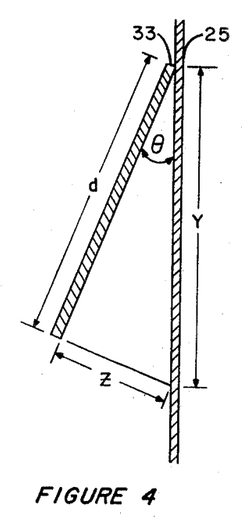
FIG. 4 illustrates graphically the geometry considerations for the acoustic transducers mounted in the pad according to FIG. 3.

The piezoelectric ceramic disk in the transducer 33 is mounted on an acute angle from the horizontal plane which is transverse to the longitudinal axis of the pad (which is parallel with the longitudinal axis of the borehole). For ease of illustrating the angle of the transducer, FIG. 4 illustrates the transmitting transducer 33 in relation to the mud cake 25 on the borehole wall. In the preferred embodiment of the invention, the angle $\theta$ is 16° and the fluid medium 41 between the face of the transducer and the periphery of the pad is Dow Corning DS-200, 100 CS silicon oil. However, other angles and fluids may be used, the determination of such being based upon the following considerations.

It should be appreciated that transducers other than those of ceramic may be used in the practice of the present invention, so long as a plane-radiating surface is achieved. Thus, by either fabricating other types of transducers, for example, capacitive, electromagnetic, ferromagnetic or magnetostrictive, to name but a few, with a flat radiating surface or by providing such other types with a flat radiating surface, such other types can readily be incorporated into the embodiments of the invention disclosed herein.

The range of transit times encountered in logging most formations is from 40 microseconds/foot (in dolomites and anhydrites) to 200 microseconds/foot in fluid. In actual practice, a range of 45 to 125 microseconds/foot will include substantially all formations of interest. The angle can thus be chosen to provide optimum reinforcement of acoustic waves in media at the midpoint of this range, i.e., 85 microseconds/foot. Referring further to FIG. 4, it is seen, by simple trigonometry, that $$Y = \frac{d}{\cos \theta} \tag{1}$$

where d is the diameter of the transducer disk; $Z = d \tan \theta$; (2)

and that $$TF(Y) = TF\left[\frac{d}{\cos \theta}\right] \tag{3}$$

where TF is the transit time in the formation.
$$TO(Z) = TO \ (d \tan \theta) \tag{4}$$

where TO is the transit time in the fluid medium.
Thus, when $TF(Y) = TO(Z)$, $\theta$ is the optimum angle. (5)

Substituting, we see that $$TF\left[\frac{d}{\cos \theta}\right] = TO(d \tan \theta) = TO\left[d\frac{\sin \theta}{\cos \theta}\right] \tag{6}$$

$$\therefore TF = TO \sin \theta \tag{7}$$

Since TO for the oil chosen, viz., DC-200, is 310 microseconds/foot, for the case where TF is considered to be 85 microseconds/foot, $\sin \theta = \frac{85}{310} = .274$ (8)

$\therefore \theta = 15.9°$, approximately 16°, which is the optimum angle for logging a formation with acoustic velocity of 85 microseconds/foot.

While the above computations relate to a given formation velocity and a given fluid coupling medium, other formation velocities or other fluid mediums would require a different angle for optimum reinforcement of the acoustic energies. In the case of lower velocity formations, energy from the remote end of the transmitter will arrive later at the receiver than that energy from the near edge of the transmitter. In the case of a higher velocity formation, energy from the remote edge of the transmitter will arrive at the receiver head of the energy from the near edge. For the example of a 1.5-inch diameter transducer, the distance Y in FIG. 4 is 1.56 inches. An acoustic wave front traveling faster, for example, 125 microseconds/foot, or slower, for example, 45 microseconds/foot, than the 85 microseconds/foot optimum would arrive at a point opposite a receiver with energy from the near edge and far edge, respectively, being about 5.2 microseconds out of synchronism. Since the transmitter rise time is 5 microseconds, acoustic energy arriving within about 5 microseconds of the optimum arrival time will thus tend to contribute usefully to the signal reaching the receiver. Accordingly, such a system provides a means for measuring acoustic velocity over a wide range.

Figure 5:
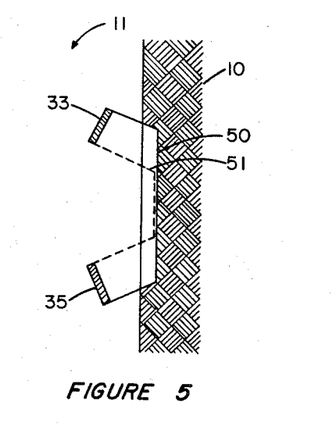
FIG. 5 illustrates schematically the different travel paths of acoustic energy between a pair of acoustic transducers according to FIG. 3.

FIG. 5 illustrates graphically how the portion of the acoustic wave front originating at the top edge of transducer 33, shown by the line 50, travels further than the portion originating at the near edge, shown by the dotted line 51. It should be appreciated, that in accordance with the present invention, by choosing the transducer the transducer angle and taking into account the acoustic velocity of the preselected fluid medium, the wave at the near edge will be delayed just enough to provide optimum reinforcement of the energy in the portions of the wave originating at all points along the transmitter face.

Referring again to FIG. 3, the receiving transducers 35 and 36 both comprise a 1.5-inch diameter, .5-inch thick lead zirconate ceramic disk, the disks being mounted, respectively, on the base members 42 and 43, for example, constructed of Teflon (polytetraflouroethylene).

Each of the ceramic disks serving as transducers 35 and 36 is mounted on an acute angle from the horizontal plane which is transverse to the longitudinal axis of the pad (which is parallel to the longitudinal axis of the borehole). It should be appreciated that the receiving area of the transducers 35 and 36 faces "upward" whereas the transmitting area of the transducer 33 faces at a "downward" angle. For the same reasons as set forth above, the receiving transducers 35 and 36 are set at an angle of 16° and immersed in Dow-Corning DC-200 100cs silicone oil to provide optimum reinforcement of the acoustic waves at the receiving transducers. In the preferred embodiment of the invention, the centers of the disks in the transducers 35 and 36 are 6 inches apart, but those skilled in the art will recognize that other distances can be used in accordance with the invention.

Likewise, while all three transducers are mounted in the same type of fluid medium at the same angle from horizontal (except for the fact that the transmitting and receiving transducers respectively face each other), a different fluid medium for the receivers could be used and the receiver angles modified accordingly for the different fluid velocity characteristic.

The sets of electrical conductors 44 and 45 respectively connect the outputs from the transducers 35 and 36 to the downhole electronics in the main instrument housing 12. Cable 13 can be a conventional 7 conductor-logging cable which provides a means for transmitting the acoustic signals from the conductors 44 and 45 illustrated in FIG. 3.

The acoustic actuating pulse from the electronics section in the main instrument housing 12 to the acoustic pad 30 and the returning signals from the acoustic receivers in the pad back to the electronics section in the instrument 12 are transmitted over separate coaxial cables and coaxial pressure feedthroughs in the pressure bulkhead (not illustrated) which separates the electronics section from the mechanical section.

As illustrated in FIG. 3, the pad member 30 has a pair of knobs 46 and 47 which hold the main body of the pad away from the wall to reduce the likelihood of a transducer being damaged by contact with a rock protrusion and to help to alleviate the "road noise" in the acoustic section. Although not illustrated, a second acoustic isolator section similar to section 34 can be placed between the knob 47 and the cavity for the transducer 36, if desired, to attenuate spurious noises generated by the knob 47 rubbing on the face of the borehole. Although the "knobs" 46 and 47 could take several forms, they might be, for example, sets of wheels or skates which can move easily along the borehole wall.

Thus there has been described an acoustic pad section wherein an actuating pulse is applied to a piezoelectric transmitting transducer causing it to increase in thickness thus pushing the surrounding medium away from it. This thickness change continues for the risetime of the actuating pulse, for example, 5 microseconds, after which the elasticity of the transducer causes it to return to its original thickness. The change of thickness sets up an acoustic wave front which travels through the intervening medium towards the formation; at the formation face it is partially refracted and some of the acoustic energy travels parallel to the borehole wall as a compressional wave which is detected by the two receiving transducers.

If the receivers are similar and have similar mountings as in FIG. 3, the mud cake and other types of interference have the same effect at each receiver and are eliminated. Thus a time interval type of measurement is made, i.e., the time elapsed between the arrival of the wave front at two receivers is a measure of the acoustic velocity of the formation, which provides valuable information relating to the formation surrounding the borehole.

Referring again to FIG. 1, the surface electronics section 48 provides a means for operating upon the voltages indicative of the acoustic signals. For example, the electronics section 48 and downhole electronics in the main instrument housing 12 could correspond, if desired, to that disclosed in U.S. Pat. No. 3,019,413 to Adrian P. Brokaw, issued on Jan. 15, 1959, and assigned to the assignee of the present invention.

The output from the pad acoustic section of the apparatus embodied herein may also provide a measurement of the distance between the sensing pad and the borehole wall as, for example, when mud cake is encountered. This utilization will become apparent to those skilled in the art from the explanations and descriptions hereinafter. There is provided surface electronics which indicates the time interval between the acoustic transmitter 33(T) and the first acoustic receiver $35(R_1)$. The time interval between the first receiver $35(R_1)$ and the second receiver $35(R_2)$ is also indicated. Relative variations of these two interval measurements indicate variations in mud cake thickness or pad standoff from the borehole wall. As mentioned above, such interval measurements are conventional and can be accomplished, for example, with the system disclosed in the above-identified patent to Brokaw. Although the spacing between T and $R_1$ and $R_2$ if desired, in practice the T to $R_1$ spacer is greater. Hence, by way of example, if the $R_1$ to $R_2$ spacing is 6 inches and the T to $R_1$ spacing is 8 inches, the time interval $TR_1$ would be expected to be about 8/6 the time interval $R_1R_2$ whenever both intervals involve only the transmission of sound along the rock face of the borehole wall. In the case of interval $R_1R_2$ the measurement is independent of mud cake and pad standoff as is well known in the art. However, the $TR_1$ interval involves the travel of the acoustic signal from the transmitter through any intervening mud, mud cake or the like before reaching the rock face. Accordingly, when the pad moves away from contact with the wall, the interval $TR_1$ increases while the interval $R_1R_2$ does not.

The travel time $TTR_1$ may be considered to be comprised of three time intervals, viz., $T_w$, $T_m$ and $T_f$. Interval $T_w$, in the absence of mud cake or standoff, is that interval required for the acoustic wave front to travel from the transmitter T to the borehole wall and to establish a refracted wave front travelling toward the receivers through the rock. Interval $T_m$ is any additional interval due to an increase in the distance between the transmitter and the rock wall. $T_m$ includes the time for travel between the transmitter and rock and also for travel between the rock and receiver. Interval $T_f$ is the time interval from the rock in the neighborhood of the transmitter to the rock in the neighborhood of the receiver. The interval $T_f$ can be expressed as $$T_f = TR_1R_2 \left[ \frac{STR_1}{SR_1R_2} \right]$$

where $STR_1$ and $SR_1R_2$ are the respective spacings between the transmitter and first receiver and between the two receivers, respectively.

It is to be understood that the spacing $STR_1$ is the effective spacing which should be measured experimentally by measuring the time interval $TTR_1$ in a medium of known velocity under conditions where no mud cake or standoff exists. Similarly, interval $T_w$ should be determined empirically. The determination of $T_w$ may be done by measuring the total interval $T_a = T_w + T_{fa}$ with no mud cake or standoff in a first medium of known velocity $V_a$ and similarly measuring $T_a = T_w + T_{fb}$ in a second medium of velocity $V_b$. It follows then that from these two measurements and the aforementioned relationships both $T_w$ and the spacing $STR_1$ can be determined.

Figure 6:
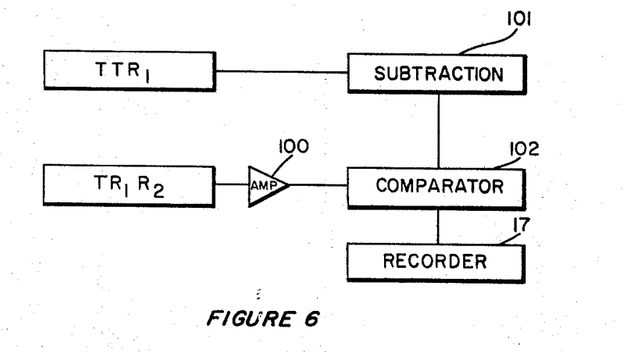
FIG. 6 illustrates in block diagram the circuitry used to provide a log of mudcake thickness or instrument standoff according to the invention.

In FIG. 6 there is illustrated in block diagram the circuitry for constantly deriving the time $T_f$. The interval travel time $TR_1R_2$, being continuously derived as hereinbefore described, is coupled through an amplifier stage 100 whose gain equals $\frac{STR_1}{STR_1R_2}$. Simultaneously, the interval $TTR_1$ is measured as above set forth. A subtraction circuit 101 subtracts the quantity $T_w$ from the value of the interval $TTR_1$, thus leaving an output equal to $T_m + T_f$. By comparing $T_m + T_f$ with $T_f$ in the comparitor 102, $T_m$ is obtained and can be recorded on the recorder 17 as a function of depth in the borehole, better illustrated with respect to FIG. 1. Thus it should be appreciated that there has been described herein a means for determining and recording the parameter $T_m$ as a function of depth in the borehole, $T_m$ being a direct indication of mud cake thickness or pad standoff.

Figure 7:
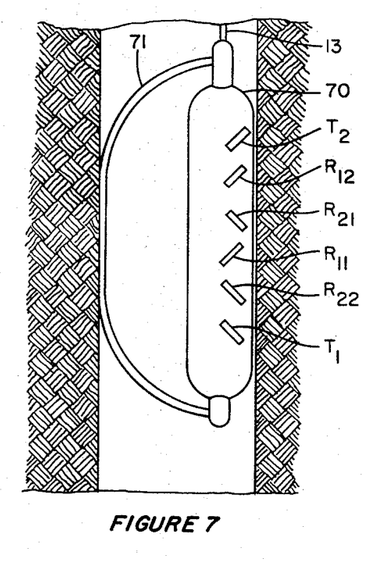
FIG. 7 illustrates schematically an alternative embodiment of the invention wherein means are provided for eliminating measurement errors at points in the borehole where the diameter is changing.

FIG. 7 schematically illustrates an alternative embodiment of the borehole instrument 70 wherein the instrument itself is urged against the borehole wall during the logging operation by a spring member 71. The instrument 70 has a pair of transmitting acoustic transducers $T_1$ and $T_2$ mounted, respectively, at an angle in a fluid medium according to the present invention, although the fluid medium and other related parts are not illustrated in this FIG. The instrument 70 is connected to the surface through the logging cable 13 as in the other embodiments herein. The instrument 70 has a pair of receiving transducers $R_{17}$ and $R_{12}$ responsive to the energy from $T_2$. It should be appreciated that such a positioning of the transducers can also be accomplished in a pad member if desired. Such an arrangement of the transducers has been found to be especially valuable for logging boreholes having a changing diameter.

Figure 8:
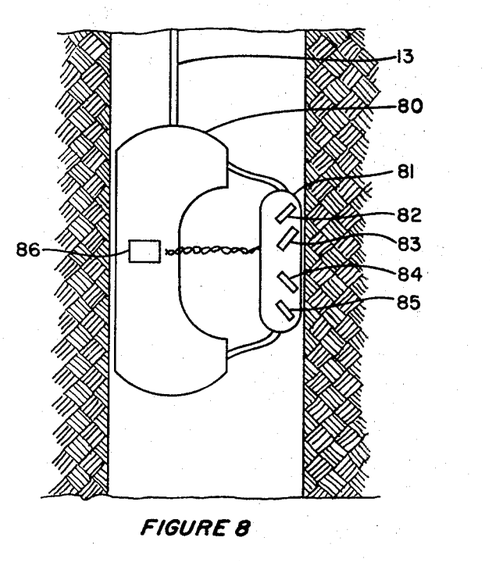
FIG. 8 illustrates schematically an alternative embodiment of the invention wherein means are provided in the acoustic sensing pad for eliminating measurement errors at points in the borehole where the diameter is changing.

FIG. 8 schematically illustrates an alternative embodiment of the borehole instrument 80 suspended on the logging cable 13. The pad member 81, being urged against the borehole wall during the logging operation, has four acoustic transducers 82, 83, 84 and 85. By conventional switching means 86, transducer 82 is in the first instance a transmitter and transducers 84 and 85 are receivers. After switching, transducer 85 is a transmitter and transducers 83 and 82 are receivers. Since transducers 83 and 84 are thus always receivers, transducers 82 and 85 need only be switched. It should be appreciated that the switching means 86 could be electronically operated to periodically switch the functions of the transducers 82 and 85 or, alternatively, could be manually switched from the surface if desired. By thus switching the transducers 82 and 83, any difference in the energies detected, on the one hand, by receivers 82 and 83 and, on the other hand, by receivers 84 and 85 provides an indication of changing borehole diameter and can be used in a conventional manner to compensate the acoustic measurements.

Figure 9:
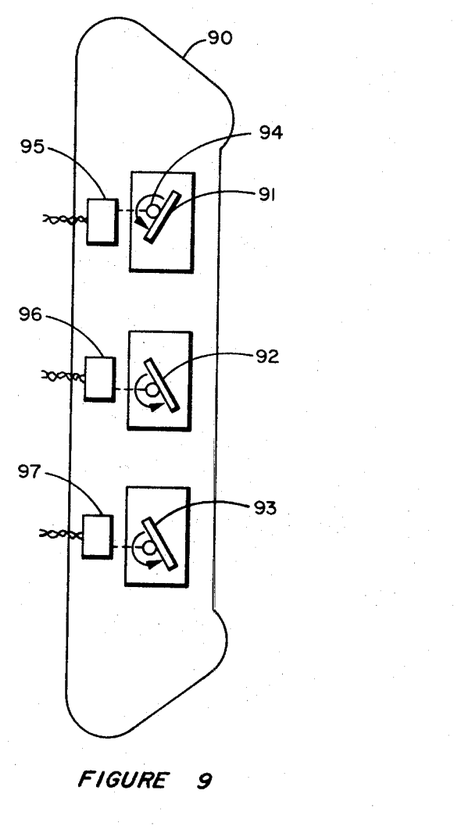
FIG. 9 illustrates schematically an alternative embodiment of the invention wherein the angle of the transducers in the acoustic pad member can be mechanically altered to permit adjustment to optimum angle.

FIG. 9 schematically illustrates an alternative embodiment of a pad member 90 for use on a borehole instrument according to the invention. In the pad member 90 are mounted a transmitter transducer 91 and a pair of receiver transducers 92 and 93, all three of the transducers 91, 92 and 93 being mounted, respectively, in a fluid-coupling medium according to the principles of the invention heretofore set forth. Each of the transducers is respectively mounted on a rotatable shaft, for example, shaft 94 connected to transducer 91. The shafts are connected, respectively, to the motor-gearbox assemblies 95, 96 and 97 which can be controlled from the surface through the logging cable 13 (not illustrated in this embodiment). However, if desired, all of the shafts could be driven by a single motor. Likewise, it should be appreciated that, if desired, the transducers could be arranged such that less than all of them are rotatable. By such rotatable mechanisms as are illustrated in FIG. 9, it should be appreciated that the angles of the transducers can be adjusted while in the borehole to optimize the reinforcement of the acoustic energies.

Figure 10:
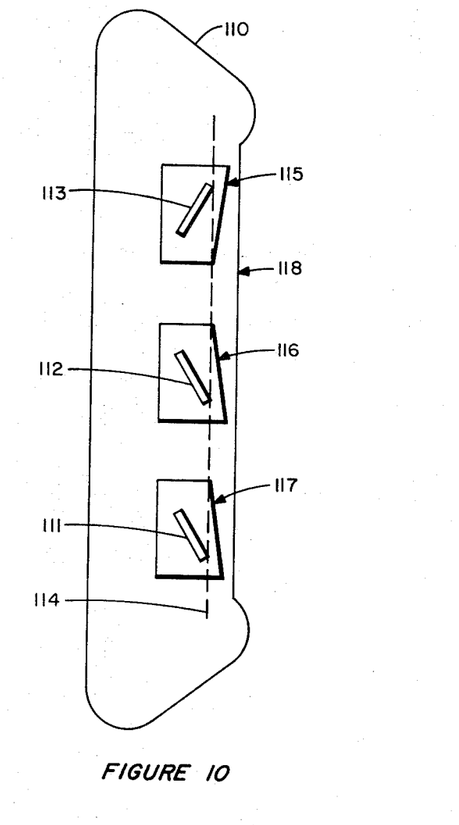
FIG. 10 illustrates schematically an alternative embodiment of the invention wherein the effective angle of the transducers can be altered by changing the plane of the interface between the transducer housing and the borehole fluid.

In FIG. 10 there is schematically illustrated an alternative embodiment of a pad member 110 for use on a borehole instrument according to the invention. A pair of acoustic receivers 111 and 112 and an acoustic transmitter 113 are mounted, respectively, at an acute angle from the longitudinal axis of the pad member 110, shown generally by the dotted line 114. Each of the transducers is respectively mounted in a fluid coupling medium within cavities in the pad member. This embodiment is characterized by the respective interfaces 115, 116 and 117 between the fluid in each of the cavities and its outer surroundings also forming an acute angle with the longitudinal axis 114. Although not illustrated as such, the interfaces 115, 116 and 117 can be formed on the exterior extreme, i.e., at the surface 118, of the pad member if desired. Although the transducer angle could be chosen to coincide with the interface angle, such would not be encompassed within the preferred embodiment, since this would tend to eliminate the differential type of delay according to the principles of the invention set forth herein. Thus, by having the interfaces at an angle appropriately chosen, the effective angle of the transducer is different from its angle with the longitudinal axis. Furthermore, if desired, the transducer angle could be substantially reduced to zero degrees while maintaining an acute angle between the interfaces and the longitudinal axis.

Figure 11:
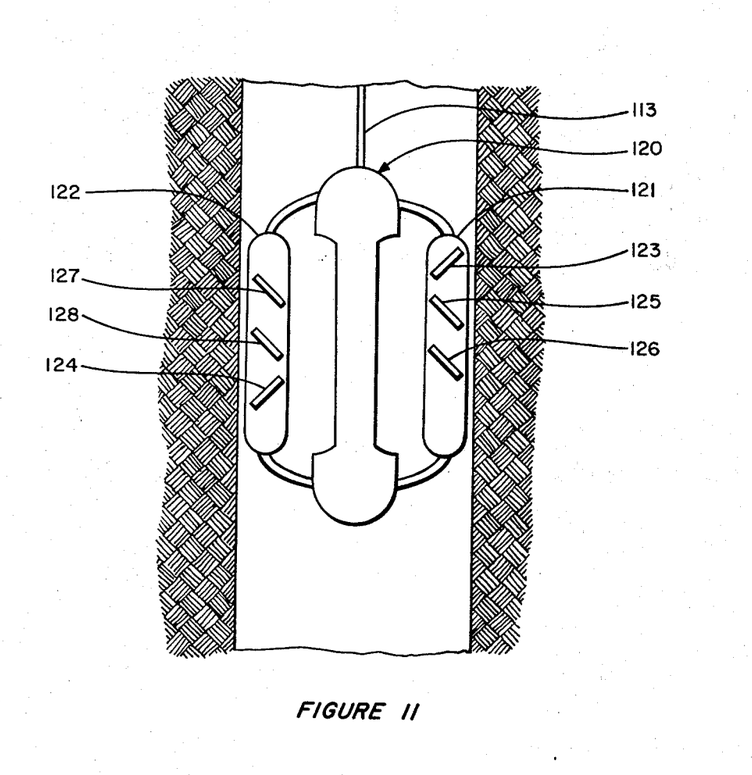
FIG. 11 illustrates schematically an alternative embodiment of the borehole instrument according to the invention.

FIG. 11 schematically illustrates an alternative embodiment of the borehole instrument 120 according to the invention, the instrument being suspended in the borehole by the conventional logging cable 13. The instrument 120 has a pair of acoustic pad members 121 and 122 mounted so as to be urged against opposite sides of the borehole. The pad member 121 has a transmitter transducer 123 mounted at an uppermost portion of the pad, whereas the pad member 122 has a transmitter transducer 124 mounted at a lowermost portion of the pad. The pad member 121 has a pair of acoustic receiving transducers 125 and 126 responsive to acoustic energy from transmitter 123, whereas the pad member 122 has a pair of acoustic receivers 127 and 128 responsive to acoustic energy from transmitter 124. Thus, by detecting differences between the measurements made with the pad members 121 and 122, the differences can be used to compensate the acoustic measurements for changes in borehole diameter. Although not illustrated the transducers in both pads are each mounted, respectively, at an acute angle from the longitudinal axis of the pad in a fluid coupling medium.

Thus there have been illustrated and described herein the preferred embodiments of a new and improved pad acoustic well-logging apparatus. While being vastly improved over prior art apparatus for measuring acoustic compressional waves, the design herein disclosed has special merit for the measurement of acoustic shear waves. The highly directional character of the acoustic transducers and the proximity of the measuring system to the formations surrounding the borehole result in the enhancement of the desired signal from the formation relative to the undersired signal which travels through the instrument itself. Further, the diode used with the transmitting transducer substantially prevents ringing of the transmitter so that the transmitted pulse approaches an ideal signal pulse configuration, thus resulting in a less confused pulse at the receiving transducers. Further, the short spacing between the transmitter and receivers results in a shorter time lag between the first arrival of the compressional wave and that of the shear wave. Since shear waves are slower than compressional waves in rocks, the compressional wave reaches the receiver first, the shear wave lagging behind by an interval proportional to the spacing between the transmitter and receiver. With the present invention, thus allowing a small spacing between the transmitter and receiver, for example, 8 inches, the compressional wave first arrival may be, for example, 90 microseconds after the transmitter pulse, whereas the shear wave first arrival would occur approximately 120 microseconds after the transmitter pulse. By contrast, with a 4-foot transmitter to first receiver spacing, in conventional equipment, the compressional and shear wave first arrivals might occur at approximately 400 and 500 microseconds, respectively, after the transmitter pulse. It should be appreciated by those skilled in the art that after several oscillations have occurred in the receiver signal, the wave train is greatly complexed. Thus, by having a reduced time lag between the first arrivals of the compressional and shear waves, the shear wave can be observed without being obscured by the complexity above described. It has been found that by using apparatus according to the present invention, the sheer wave can be reliably detected by an appropriately adjusted amplitude discriminator. Thus, there has been described and disclosed herein a new and improved apparatus for detecting acoustic shear waves.

From a reading of the foregoing description relating to the preferred embodiments of the invention, it will be apparent to those in the art that the objects of the invention have been obtained by apparatus capable of yielding improved information relating to the formations surrounding earth boreholes, especially information obtainable by acoustic well-logging techniques.

While the preferred embodiments of the invention have been specifically described, it will be understood that modifications and variations may be made therein without departing from the scope of the invention. and that such modifications and variations as are within the spirit and scope of the invention it is broader aspects are encompassed in the appended claims. For example, while the acoustic transducers have been illustrated and described as being substantially flat, the transducer according to the invention can be contoured to match the inner surface of the borehole wall and yet be positioned at an acute angle with respect to the longitudinal axis of the instrument.

The embodiments of the invention in which an exclusive property or privilege is claimed are defined as follows:

We claim:

1. An acoustical well-logging apparatus for logging the formations surrounding an earth borehole, comprising:
    an elongated housing adapted to traverse an earth borehole;
    at least one acoustical transmitting transducer mounted in said housing at an acute angle relative to the longitudinal axis of said housing, said transducer having a transmitting face for transmitting an acoustic wave into the formations surrounding the borehole;
    at least one acoustic receiving transducer mounted in said housing, said transducer having a receiving face for receiving the acoustic wave after it travels through the formations surrounding the borehole; and
    fluid means between the transmitting face of said transmitting transducer and the periphery of said housing for differentially delaying the acoustic wave from different portions of the transmitting face so that all portions of the acoustic wave reach the receiving face of the receiving transducer at substantially the same time.

2. The apparatus according to claim 1 wherein said at least one receiving transducer is mounted in said housing at an acute angle relative to the longitudinal axis of said housing.

3. The apparatus according to claim 2 wherein said transmitting transducer and said at least one receiving transducer are mounted at the same acute angle.

4. The apparatus according to claim 3 wherein said angle is approximately 16°.

5. An acoustical well-logging apparatus for logging the formations surrounding an earth borehole, comprising:
    an elongated housing adapted to traverse an earth borehole, said housing having a given longitudinal axis substantially parallel to the longitudinal axis of said borehole;
    at least one acoustic transmitting transducer with a plane radiating surface mounted in said housing for transmitting an acoustic wave into portions of the formations surrounding the borehole;
    at least two acoustic receiving transducers mounted in said housing, said transducers having receiving faces for receiving the acoustic wave after it travels through portions of the formations surrounding the borehole; and
    fluid means located between the transmitting face of the transmitting transducer and the periphery of said housing and between the receiving faces of the receiving transducers and the periphery of said housing for differentially delaying the acoustic wave from different portions of the transmitting face of the transducer so that when the acoustic wave reaches a receiving transducer all portions of the wave arrive at the receiving face at substantially the same time.

6. An acoustical well-logging apparatus for logging the formations surrounding an earth borehole, comprising:
    an elongated housing adapted to traverse said borehole;
    at least one acoustic transmitting transducer mounted in said housing at an acute angle relative to the longitudinal axis of said housing, said transducer having transmitting face for transmitting an acoustic wave into the formations surrounding the borehole;
    at least one acoustic receiving transducer mounted in said housing, said transducer having a receiving face for receiving the acoustic wave after it travels through the formations surrounding the borehole; and
    fluid means located between the transmitting face of the transmitting transducer and the periphery of said housing and between the receiving faces of the receiving transducers and the periphery of said housing for differentially delaying the acoustic wave from different portions of the transmitting face so that all portions of the acoustic wave reach the receiving face of the receiving transducer at substantially the same time.

PO-1050
(5/69)

UNITED STATES PATENT OFFICE
CERTIFICATE OF CORRECTION

Patent No. 3,542,150            Dated November 24, 1970

Inventor(s) Arthur H. Youmans and James O. Guy

It is certified that error appears in the above-identified patent and that said Letters Patent are hereby corrected as shown below:

Column 1, line 18, change "are" to "is".

Column 2, lines 10 and 11, delete "such as diameter variations the condition of a borehole wall";

line 27, change "as" to "at"; and line 36, change "illustrated" to "illustrates".

Column 3, line 23, change "with" (second occurrence) to "by".

Column 5, line 9, delete "the transducer" (first occurrence).

Column 6, line 30, change "35" to "36";

line 36, after "$R_1$" and before "and", insert --could be the same as that between $R_1$".

Column 7, line 3, change "$T_a$" to "$T_b$"; and line 32, change "$R_{17}$" to "$R_{11}$".

Column 8, line 58, change "signal" to "single".

Column 10, claim 6, line 6 of the claim, after "having" and before "transmitting", insert "a".

Signed and sealed this 1st day of May 1973.

(SEAL)
Attest:

EDWARD M. FLETCHER, JR.            ROBERT GOTTSCHALK
Attesting Officer                   Commissioner of Patents